United States Patent
Eisele et al.

(10) Patent No.: US 9,555,550 B2
(45) Date of Patent: Jan. 31, 2017

(54) HOLDING DEVICE FOR GRIPPING WORKPIECES WITH COMPLEX SHAPES OR DEFORMABLE SURFACES

(71) Applicant: J. Schmalz GmbH, Glatten (DE)

(72) Inventors: Thomas Eisele, Alpirsbach-Peterzell (DE); Harald Kuolt, Deilingen (DE); Marcus Eberle, Lauterburg (DE); Walter Dunkmann, Baden-Baden (DE); Aline Defranceski, Horb a.N. (DE); Florian Fritz, Tuebingen (DE); Hermann Reinisch, Sulz a.N./Hopfau (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 14/727,948

(22) Filed: Jun. 2, 2015

(65) Prior Publication Data

US 2015/0367517 A1    Dec. 24, 2015

(30) Foreign Application Priority Data

Jun. 5, 2014   (DE) .................... 10 2014 210 748

(51) Int. Cl.
*B66C 1/02*      (2006.01)
*B25J 15/00*     (2006.01)
(Continued)

(52) U.S. Cl.
CPC ......... *B25J 15/0052* (2013.01); *B25J 15/0033* (2013.01); *B25J 15/0061* (2013.01); *B25J 15/0616* (2013.01); *B29C 70/54* (2013.01)

(58) Field of Classification Search
CPC .................................................. B25J 15/0052
(Continued)

(56) References Cited

U.S. PATENT DOCUMENTS 3,720,433 A * 3/1973 Rosfelder ............. B66C 1/0243
                                                              294/188
3,775,932 A * 12/1973 Jeney .................. B29C 65/7847
                                                              425/388
(Continued)

FOREIGN PATENT DOCUMENTS

DE    202007013673 U1    2/2009
DE    102011106214 A1   12/2012
(Continued)

OTHER PUBLICATIONS

Communication dated Apr. 15, 2016 enclosing the European Search Report dated Apr. 7, 2016 issued by the European Patent Office for European Patent Application No. 15168163.
(Continued)

*Primary Examiner* — Paul T Chin
(74) *Attorney, Agent, or Firm* — Howard & Howard Attorneys PLLC (57) ABSTRACT

A holding device (10) having a plurality of gripping devices (18) which are arranged displaceable relative to each other on a support structure (12) in such manner that by their displacement gripping devices (18) are adjustable to a free-form surface. The support structure (12) comprises a plurality of mutually associated movable support elements (22) on which are arranged gripping devices (18), wherein a plurality of support elements (22) are arranged in a row and are connected to form a carrying chain (24) such that the carrying chain (24) is form-adjustable by the movement of the support elements (22) relative to each other.

13 Claims, 5 Drawing Sheets

(51) Int. Cl.
    *B25J 15/06*    (2006.01)
    *B29C 70/54*    (2006.01)
(58) Field of Classification Search
    USPC ........ 294/65, 188, 189, 183, 185, 186, 86.4; 414/627, 737, 752.1; 901/40
    See application file for complete search history.

(56) References Cited

U.S. PATENT DOCUMENTS

| | | | | |
|---|---|---|---|---|
| 3,837,782 | A * | 9/1974 | Meissner | B29C 51/00 425/347 |
| 3,955,843 | A * | 5/1976 | Ottenhues | B66C 1/0243 294/189 |
| 7,717,482 | B2 * | 5/2010 | Iwasaki | B25J 15/0616 294/188 |
| 2001/0045755 | A1 * | 11/2001 | Schick | B25J 15/06 294/65 |
| 2012/0181804 | A1 * | 7/2012 | Schmidt | B65G 47/917 294/185 |
| 2014/0199153 | A1 | 7/2014 | Reinhold et al. | |
| 2015/0298320 | A1 * | 10/2015 | Eisele | B25J 15/0071 294/24 |
| 2015/0352796 | A1 * | 12/2015 | Eisele | B29C 70/54 264/320 |

FOREIGN PATENT DOCUMENTS

| | | |
|---|---|---|
| DE | 102012019958 A1 | 4/2013 |
| DE | 102011056029 A1 | 6/2013 |
| DE | 102012003094 A1 | 8/2013 |
| DE | 102013201765 A1 | 8/2014 |

OTHER PUBLICATIONS

Communication dated Apr. 22, 2016 enclosing the European Search Report dated Apr. 14, 2016 issued by the European Patent Office for European Patent Application No. 15168164.

* cited by examiner

HOLDING DEVICE FOR GRIPPING WORKPIECES WITH COMPLEX SHAPES OR DEFORMABLE SURFACES

CROSS-REFERENCE TO RELATED APPLICATIONS

The present application claims priority to and all the benefits of German Patent Application No. 102014210748.2, filed on Jun. 5, 2014, which is hereby expressly incorporated herein by reference in its entirety.

BACKGROUND OF THE INVENTION

1) Field of the Invention

The invention relates to a holding device.

2) Description of the Related Art

Holding devices typically include a plurality of gripping devices movable relative to each other, whose spatial arrangement overall can be adjusted to the desired free form. Such holding devices are used for example to fix workpieces with uneven surfaces, for example to clamp them during their handling. A clamping device is known for example from DE 10 2013 201 765 A1. This clamping device comprises a plurality of tappets axially displaceable with respect to a basic structure with gripping devices arranged at their free ends respectively. By axial displacement of the tappets, the gripping devices viewed as a whole can closer follow the profile of a desired surface.

Holding devices with a plurality of relatively movable gripping devices can also be used in the handling of flexible and/or two-dimensional and/or mat-like workpieces such as textiles, fiber mats, foils or flexible sheets. Thus, for example, when manufacturing fiber composite parts, the cut sheet-like material pieces must be removed from the generally flat initial configuration and transferred to a usually three-dimensional curved target shape. This must be precise in the series process, carried out reproducibly and reliably. Complex holding devices with individually driven tappets can thereby prove sluggish and expensive.

SUMMARY OF THE INVENTION

The invention has for its object to make the gripping surface of a holding device adjustable to freeform surfaces in a structurally simple and reliable way. In particular, using the holding device it should be possible to bring held workpieces (e.g. two-dimensional and/or flexible materials) in a controlled manner to a desired free-form surface.

This object is achieved by a holding device of the present invention, which can be used in particular for gripping or clamping workpieces with complex shapes or deformable surfaces. The holding device comprises a plurality of gripping devices for fixing an object that rests against it. Gripping devices are arranged mutually displaceable relative to a support structure (in particular displaceable in height) so that by shifting them the gripping devices can be adjusted to a free-form surface.

The support structure comprises a plurality of support elements which are preferably movably connected directly to each other, and on which are arranged the gripping devices. A plurality of support elements are arranged in a row and connected to a carrying chain, so that the carrying chain is relatively form-adjustable by the movement of the support elements. The carrying chain is particularly adaptable to a curved line, which extends in the desired free-form surface.

In particular, the carrying chain is bendable into curved shapes and extendable again in a controlled manner. Thus the desired free-form surface can be represented in a simple manner or approximated by the gripping devices. The holding device can be flexibly adapted to different uses. In particular, an extension of the carrying chain by adding support elements is possible. It is not imperative for the form-adjustability that each support element be actively driven. So it may be sufficient, for example, to provide a drive for only a few selected support elements to move all the support elements. The other support elements are moved continuously along the carrying chain due to the movable connection.

In this respect, the support elements are connected to form the carrying chain in the kind of vortex elements in a spine. Advantageously, based on a few selected or all the support elements of the carrying chain, at least one form-adjustable ribbed arm extends in the lateral direction to the carrying chain. The lateral direction may extend substantially perpendicular to the carrying chain. In particular, at least one gripping device is arranged on the ribbed arm. According to an advantageous embodiment, on each respective support element of the carrying chain can be arranged two ribbed arms which are substantially opposite to each other and extend laterally away from the carrying chain.

For further improvement, a damping element can be provided in a transition region between the carrying chain and the ribbed arm in particular such that the oscillating movements of the ribbed arm with respect to the carrying chain can be suppressed. This makes possible a reliable holding and a reliable form change.

By the laterally extending ribbed arm the contact surface spanned by the holding device can be formed along different directions or be adapted along independent directions, in particular along the carrying chain and laterally thereto.

In principle, the ribbed arm can for example be a flexible carrier. However, in particular it is conceivable that also the ribbed arm is made modularly as a chain of interconnected movable support elements, which enables a flexible form-adjustability. In addition, a chain-like ribbed arm can be flexibly expanded by adding additional support elements. In this sense, starting from some selected or all support elements of the carrying chain, in particular several other support elements can be movably connected to one another in a row to form a ribbed chain, wherein the ribbed chain extends in a direction lateral to the carrying chain (in particular substantially perpendicular to the carrying chain). The connection of the support elements in the ribbed chain is preferably such that the ribbed chain is form-adjustable by the movement of the support elements relatively to each other. In this respect, the ribbed chain can form the aforesaid ribbed arm. The ribbed chain is preferably also movably connected to the support element, from which it extends. In particular, the support element, from which the ribbed chain starts, can be part of the ribbed chain and the carrying chain.

The ribbed arm or the ribbed chain extends in the lateral direction in the manner of a rib of the vertebrae of the spine (carrying chain) formed by the support elements. The support elements connected into the ribbed chain can be configured identically to the support elements connected into the carrying chain. However, it is also conceivable that the ribbed elements connected in the ribbed chain are formed differently from the support elements of the carrying chain.

Preferably, the ribbed arm or the ribbed chain has a bending actuator by which the ribbed arm or the ribbed chain can be bent into a vaulted, in particular an arched form.

Preferably, the bending actuator comprises an actuator member that extends along the ribbed arm or the ribbed chain so that, by retraction and extension of the actuator member, the ribbed arm or the ribbed chain is flexible and extendable.

The actuator member can in particular comprise at least a spindle, which between at least two adjacent support elements along the ribbed chain acts such that by rotating the spindle the respective adjacent support elements are angled against each other. For this purpose each of the spindle (or their spindle helices) on the support elements can be provided with engagement sections, into which engages the spindle. The engagement section on the support elements is arranged in particular offset relative to a connecting element (for example, joint, hinge or the like), by which the adjacent support elements are connected in an offsetable manner. The spindle can be actively rotated in particular by a suitable rotary drive.

The offsetting of the support elements relative to each other generated by the rotation of the spindle depends on the slope of the spindle. For further refinement, the slopes of the spindles can be different for different ribbed arms or different ribbed chains. It is also conceivable that the bending actuator within a ribbed arm between adjacent support elements comprises differently designed spindles, which for example differ in their slope. This design allows realizing differently vaulted or differently curved sections along the course of ribbed arm.

Based on some or all of the support elements of the carrying chain, preferably two ribbed chains are provided which extend in essentially opposite directions. The carrying chain can extend centrally between the ribbed chains which extend away from the carrying chain.

If, for example, more than one ribbed chain is provided that extends away from different support elements of the carrying chain, then the ribbed chains are in particular arranged such manner that the neighboring ribbed chains along the carrying chain extend each in substantially the same direction. It is in particular provided that, based on this orientation, the ribbed chains can be deflected or deformed to match the desired free-form surface.

For further refinement, a connecting element variable in shape or variable in configuration is arranged between each two adjacent support elements in the carrying chain, by which the adjacent support elements of the carrying chain are movably connected with each other. Accordingly, between two neighboring support elements in the ribbed chain a form-variable connecting element may be provided to which the adjacent elements in the ribbed chain are movably connected.

The connecting element preferably has a force-free neutral position from which it can be elastically deformed (i.e. changed into a different configuration). The connecting element is in particular formed so that it exerts a force opposing to the deformation out of the neutral position, and in particular acts resiliently. Thus, upon deflection of the neighboring support elements, the connecting element springs back to its neutral position. This allows achieving that by active movement of individual support elements of the carrying chain the remaining support elements are constantly entrained.

The connecting elements are, for example, formed such that the adjacent support elements in the carrying chain are mutually angled by the connecting elements. To this extent the connecting elements can be formed as a hinge. In addition, spring elements providing the force-free neutral position and capable of providing said counterforce can be provided.

For further refinement, the holding device comprises driven actuators which are adapted to shift at least two different support elements of the carrying chain relative to one another, in particular to angle them relative to one another.

According to one possible embodiment, the actuators act on pivot points, which are arranged on the support elements of the carrying chain and/or on the connecting elements between the support elements (where provided). The actuators are designed in particular such that the support element can be pivoted by the actuators toward each other. By moving only individual support elements of the carrying chain, the adjacent support elements are each entrained. Therefore, with relatively few actuators a continuously adjustable contact surface of the holding device can be represented. Not every support element must be necessarily actively moved.

The actuators are for example designed as pneumatic or hydraulic cylinders or as electrically operated actuators. Preferably, the holding device comprises a basic structure in which the actuators are arranged on the one hand on the basic structure and the other hand on the support structure, that is, they act between the basic structure and the support structure.

However, it is also conceivable that at least one of the actuators comprises a rotationally drivable spindle to shift the support elements of the carrying chain, as explained above for the ribbed chain. The spindle acts between at least two adjacent support elements such that by rotating the spindle the carrying elements can be angled against each other. Here, too, it is conceivable that between different support elements in each case differently shaped spindles act, for example, with different slopes. The embodiments explained for the ribbed chain can be used mutatis mutandis.

The design with the spindle has the advantage that the deformation of the carrying chain with only one rotary drive for the spindle (or with only a few rotation actuators) can be realized. A further advantage is that the set position of adjacent support elements to each other can be locked by the spindle. This makes it possible to move and twist the gripping device in space as a whole in a certain configuration without changing the carrying chain and/or the ribbed chain in form due to gravity.

The gripping devices can for example be designed as a vacuum gripper, magnetic gripper or electric adhesion gripper. However, also conceivable is a combination of several different gripping principles, for example, a suction gripper (suction pad) and an adhesion gripper.

In particular, on each support element of the carrying chain and/or on each support element of the ribbed chain (if any), can be provided a gripping device, in particular one gripping device.

The gripping devices are especially oriented such that an active gripping surface of each gripping device is facing the same direction with linearly extending course of the carrying chain or the ribbed chain. In this respect, the gripping surfaces of the individual gripping devices approximate a common gripping surface of the holding device. In particular, the gripping devices are all arranged such that they act in parallel.

The gripping devices are preferably formed changeable and/or activated and deactivated in their gripping force independently from each other. For this purpose, there can be provided a controller for controlling the individual gripping devices. The controller, for example, communicates via a bus system with the individual gripping devices. To that extent it is possible for provide, with a high or a low retaining force, specifically selected areas of the total gripping surface of the gripping devices of the holding device. This can for example be advantageous if a flexible material captured in, for example, a flat initial configuration is to be deformed by the displacement of the individual support elements into a desired shape. It is often required that certain areas along the whole formed gripping surface of the holding device can slide down to allow the bending of the total formed gripping surface. This can be supported by selective enabling and disabling of individual gripping devices.

In a further embodiment, the holding device comprises sensors, by which the forces acting on the support element are measurable. In particular, the sensors are configured such that the pressure or tensile forces acting along the carrying chain, and/or the forces acting along the lateral directions (for example along the ribs) can be measured. Thus, for example, it can be determined whether undesirable tensile stresses occur during the deformation of the material held. The sensors can also be configured to measure the expended holding force on the gripped object. In particular, it is conceivable that each support element or selected support elements of the carrying chain and/or the ribbed chain comprise corresponding sensors.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
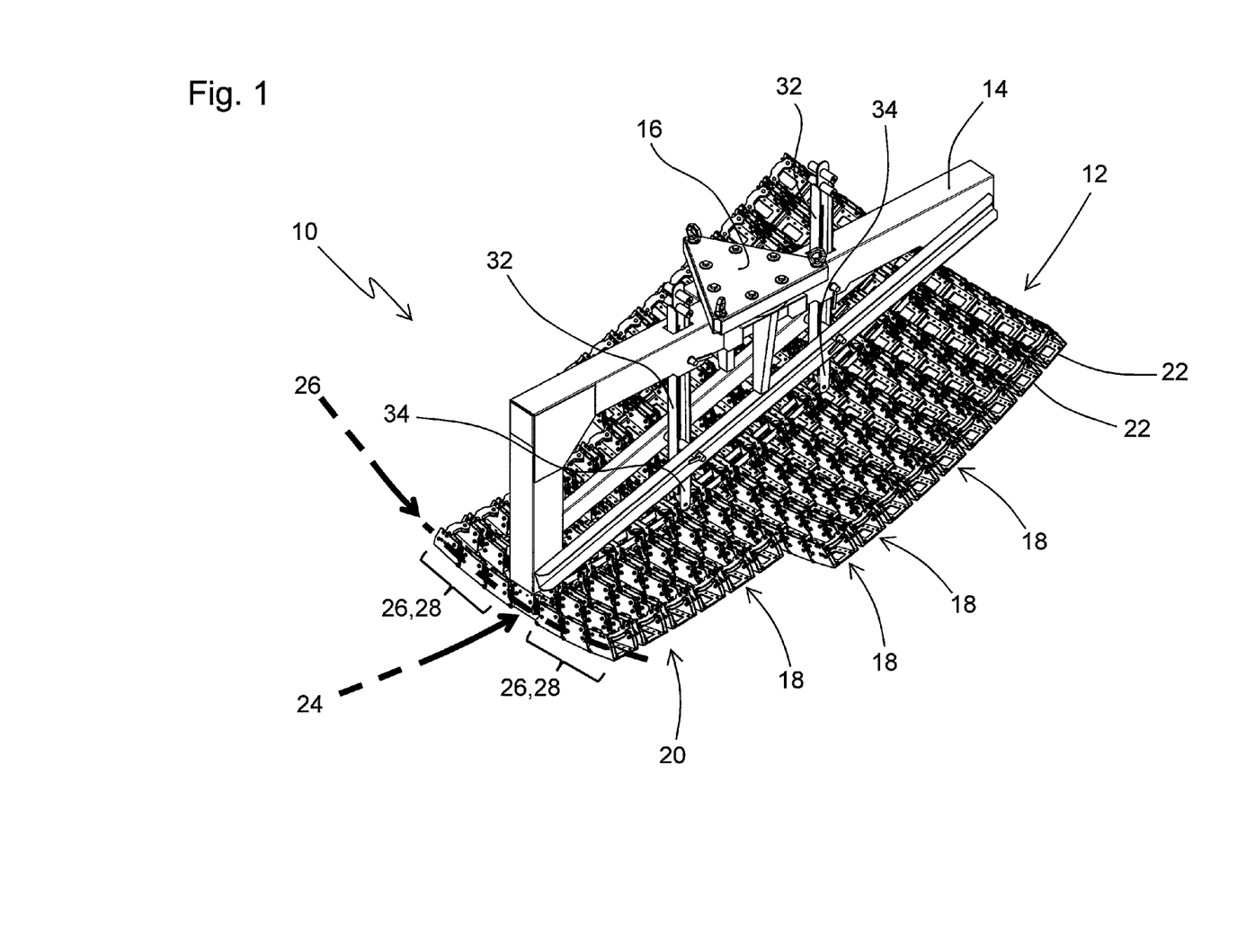
FIG. 1 is a perspective view of the holding device of the present invention.
Figure 2:
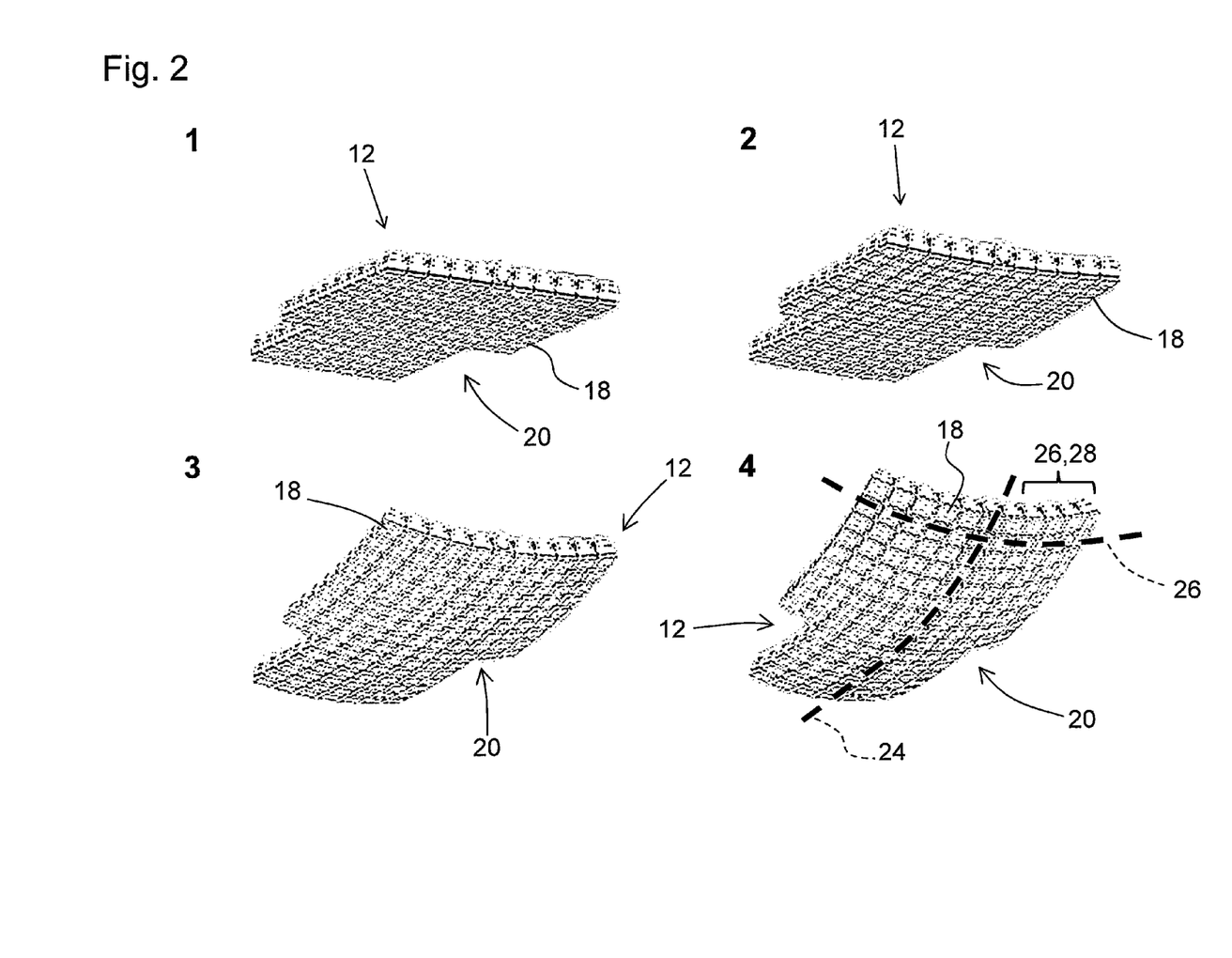
FIG. 2 is a perspective view of the whole formed gripping surface of the holding device according to FIG. 1 in various configurations.

In the following description and in the figures the same reference numerals are used for identical or corresponding features. FIGS. 1 and 2 show a holding device 10 with a modular support structure 12 shown in the example, which is supported by a basic structure 14. The basic structure 14 comprises for example a connecting section 16 for arranging the holding device 10 in a handling device, for example, on a robot arm or the like.

A plurality of gripping devices 18 is provided on the support structure 12, which are displaceable relative to each other. In FIGS. 1 and 2, the gripping devices 18 are not shown in detail for reasons of clarity. Rather, the gripping devices are installed in the corresponding support elements, which will be explained in more detail below with reference to FIGS. 3-6. The gripping devices 18 are shown in detail in FIGS. 7 and 8. By shifting the gripping devices 18 relative to one another, a gripping surface 20 of the holding device 10 is provided that is spatially adaptable to the desired free-form surface.

FIG. 2 shows different views on the overall formed gripping surface 20 of the holding device 10. By moving the individual gripping devices 18 relative to each other, various vaulted and/or curved free-form surfaces are approximated by the gripping surface 20, i.e. the gripping surface 20 can be adapted to various free-form surfaces.

Figure 3:
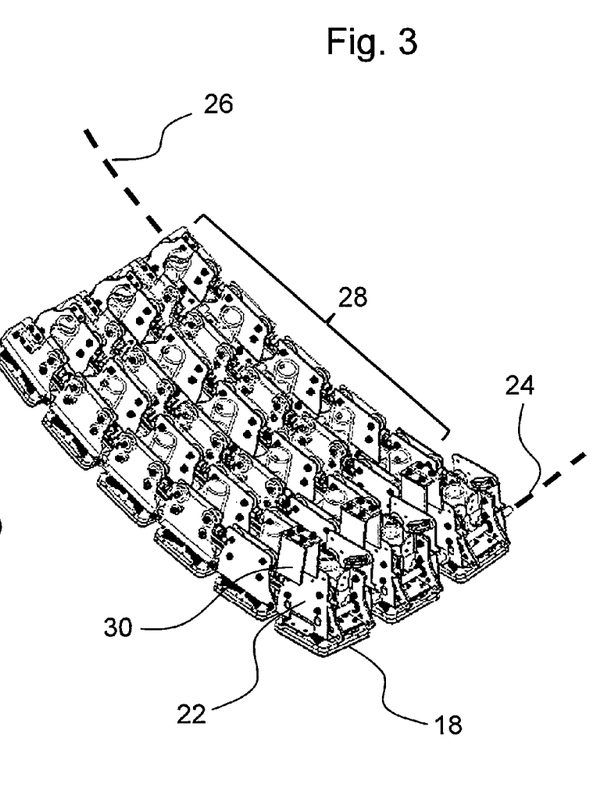
FIG. 3 is a detailed view of a section of the support structure of the holding device of the present invention.

The form-adjustable support structure 12 comprises a plurality of modular support elements 22, wherein in each case one gripping device 18 is arranged in one support element 22 (see FIG. 3). The support elements 22 are connected to each other like a chain in a row, wherein different chains are formed, which are indicated in FIGS. 1 and 2 with dashed lines or arrows. Firstly, several support elements 22 are connected in a row 22 to form a carrying chain 24 which in the illustrated example extends centrally through the whole formed gripping surface 20. Based on the support elements 22 of the carrying chain 24 a plurality of support elements 22 are connected to form ribbed chain 26. In the example shown, from each support element 22 of the carrying chain 24 two ribbed chains 26 extend away from the carrying chain 24 in substantially opposite directions. The ribbed chains 26 form ribbed arms 28, which extend away from both sides of elements 22 of the carrying chain 24 substantially perpendicular to the carrying chain 24.

Figure 4:
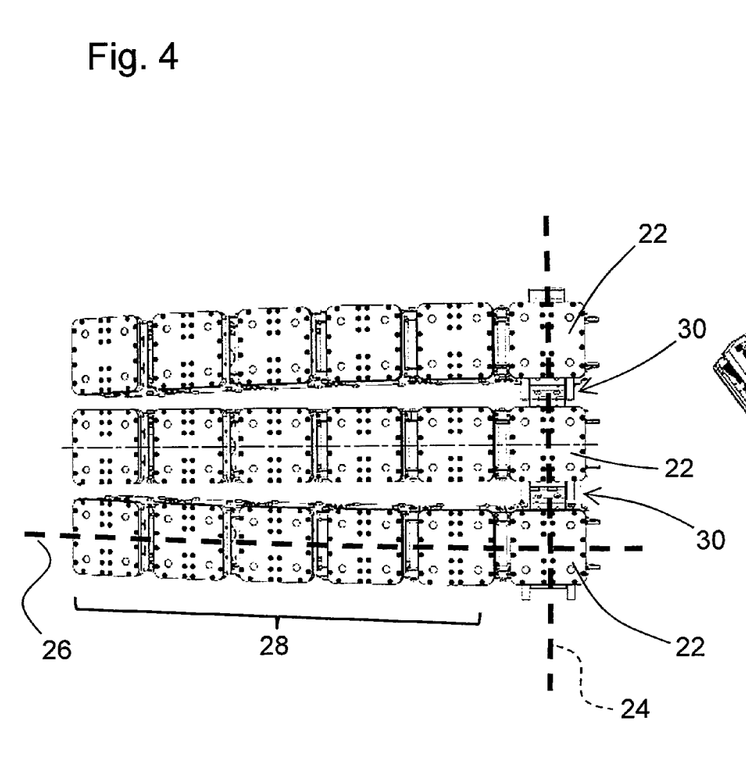
FIG. 4 is a detailed view of the support structure shown in FIG. 3 with a view on the gripping surfaces.

FIGS. 3 and 4 show a detail of the support structure 12. In this case, a section of the carrying chain 24 is visible, wherein in the illustrated detail a ribbed arm 28 extends away from the support elements 22 of the carrying chain 24.

The support elements 22 of the carrying chain 24 are connected to one another in a row by the connecting elements 30. The connecting elements 30 are designed such that they allow an angling of the respective adjacent support elements 22 of the carrying chain. The connecting elements 30 preferably have a force-free neutral position, wherein a counter-force is applied against an angling out of this neutral position. It is conceivable that the connecting elements 30 are designed as spring-loaded joints. In a simple embodiment, for example, that each two adjacent support elements 22 of the carrying chain 24 are connected with an elastically resilient angle (see FIG. 6).

Due to the connecting elements 30, the respective adjacent support elements 22 are elastically entrained with an active movement of individual support elements 22 of the carrying chain. Thus, a continuous deformation of the carrying chain 24 can be achieved. As best shown in FIG. 1, here a few actuators may be sufficient. For example, in FIG. 1 two actuators 32 are provided, each of which comprises a piston 34 that acts between the basic structure 14 and the support structure 12. Each of the actuator piston 34 acts on an assigned pivot point of the carrying chain 24. The pivot point is, for example, on a selected support element 22. By extension and retraction of the actuator piston 34, the respective support element is pushed away from the basic structure 14 or pushed to it. The adjacent support elements are entrained due to the connecting elements 30.

Figures 5, 6:
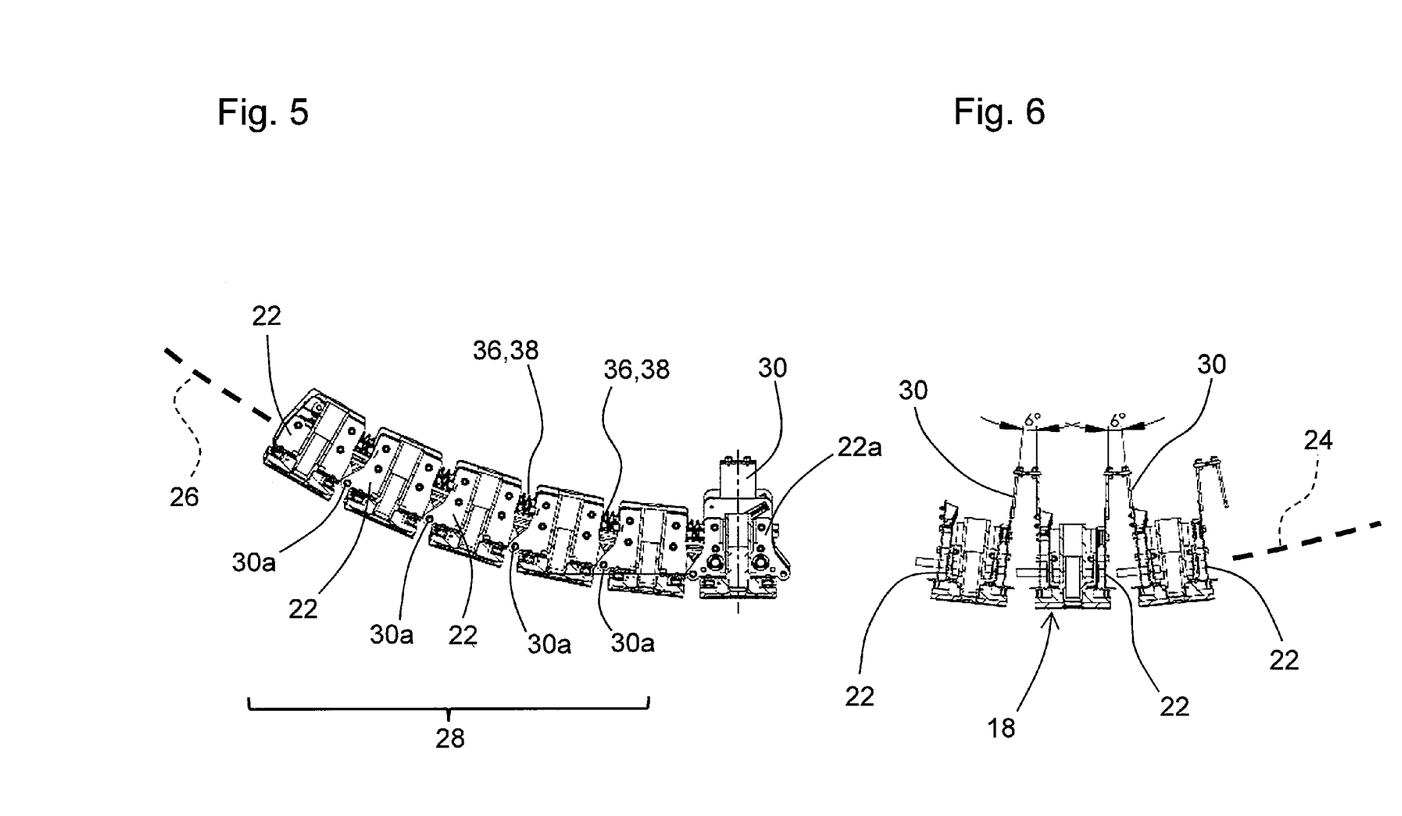
FIG. 5 is a side view of a ribbed chain.
FIG. 6 is a side view of the carrying chain.

FIG. 5 shows a side view of the ribbed arm 28, which extends from a selected support element 22a of the carrying chain 24. The support elements 22 of the ribbed arm 28 are pivotally interconnected by connecting elements 30a. In order to deflect the ribbed arm 28 in a controlled manner, a bending actuator 36 is provided, which comprises an actuator member 38 that extends along the ribbed chain 26. In the example shown, the actuator member 38 is formed by a spindle that acts on the support elements 22, which extends between each two adjacent support elements 22 being offset to the articulated connecting elements 30a and engages with corresponding engagement section of the support members. By turning in and turning out the spindle, two adjacent support elements 22 of the ribbed chain 26 can be angled against each other in a controlled manner. The spindle in this case has a pitch (e.g. defined by the pitch of the spindle per revolution), which specifies the angulation of the support elements against each other associated with one spindle rotation of the support members.

FIG. 6 shows a longitudinal section along the carrying chain 24, in which the connecting elements 30 designed in the shown example as spring-loaded angles are visible between the support elements 22.

Figure 7:
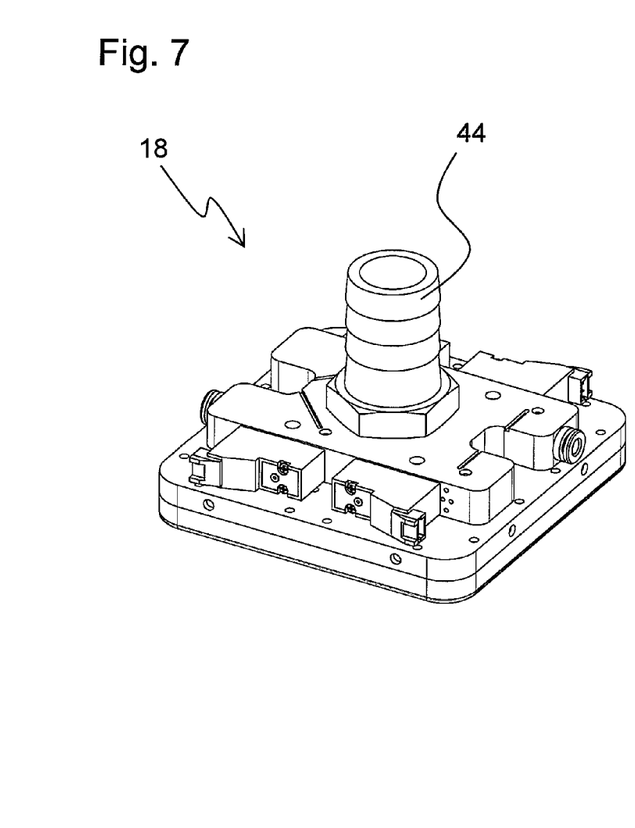
FIG. 7 illustrates one possible design for the gripping devices.
Figure 8:
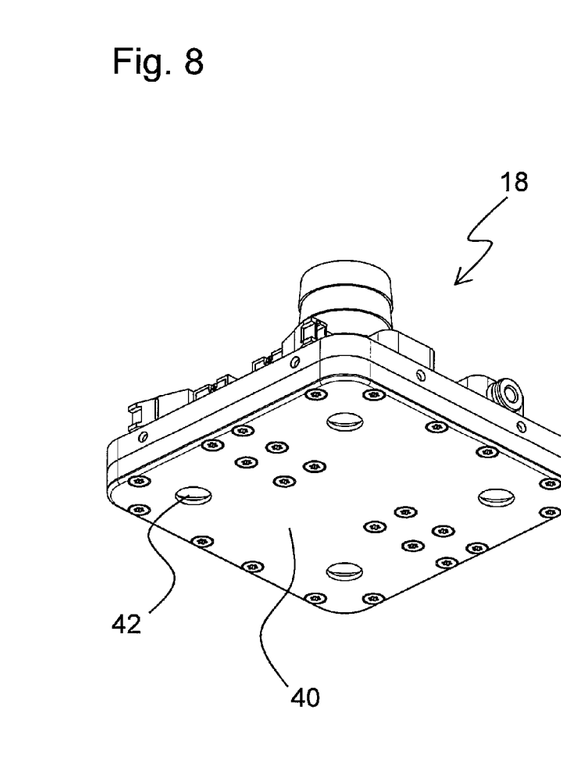
FIG. 8 illustrates another possible design for the gripping devices.

FIGS. 7 and 8 show in detail exemplary usable gripping devices 18, which can be installed in the support elements 22 of the support structure 12. A gripping surface 40 of the individual gripping device 18 for exerting a gripping force is so oriented in the arrangement of the gripping device 18 in the support elements 22 that the gripping surface 40 of the individual gripping device 18 lies in the total gripping surface 20 of the holding device 10.

In the illustrated example the gripping device 18 is configured as a vacuum gripper, wherein the gripping surface 40 comprises intake ports 42 through which a suction flow can be sucked. To supply the individual gripping devices 18 with vacuum, they can for example have a connecting piece 44. The various connecting pieces 44 can then be connected to a common vacuum supply system, for example on the back of the gripping surface 20 of the holding device 10. For individual activation and deactivation of the gripping effect of individual gripping devices 18, the gripping devices 18 may have additional individually controllable valves, which are preferably integrated into the gripping devices 18. The support elements 22 assigned to the gripping can have sensors which for example are designed to perform measurements between adjacent support elements 22 in the chain 24 or in a respective ribbed chain 26.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A holding device having a plurality of gripping devices which are arranged movably relative to each other on a support structure in such a manner that by a displacement of the gripping devices relative to each other, the gripping devices can be adapted to a free-form surface,
wherein the support structure includes a plurality of associated support elements, wherein a gripping device is disposed on each of the support elements, wherein a plurality of support elements are arranged in a row and are connected to form a carrying chain, and wherein the support elements are movably connected with each other by a deformable connecting element which is provided between each two adjacent support elements of the carrying chain, such that the carrying chain is form-adjustable by the movement of the support member relatively to each other.

2. The holding device as set forth in claim 1, characterized in that a form-adjustable rip-like arm is provided which extends from a support element of the carrying chain in the lateral direction to the carrying chain.

3. The holding device as set forth in claim 1, wherein a plurality of further support elements are movably connected with one another to form a rip-like chain, and wherein the ribbed chain extends from a support element of the carrying chain along a lateral direction to the carrying chain.

4. The holding device as set forth in claim 3, wherein the rip-like chain has a bending actuator, by which the ribbed chain is deflectable in a curved shape.

5. The holding device as set forth in claim 4, wherein the bending actuator has at least one rotationally drivable spindle which acts at least between two adjacent support elements of the rip-like chain acts in such a manner that by turning the spindle the support elements are angled with respect to each other.

6. The holding device as set forth in claim 3, wherein, for at least one of the support elements of the carrying chain, in each case two rip-like chains are provided.

7. The holding device as set forth in claim 3, wherein a deformable connecting element is provided between each two support members adjacent in a rip-like chain, by which the adjacent support members of the rip-like chain are movably connected with one another.

8. The holding device as set forth in claim 1, wherein the connecting element has a neutral position from which it is elastically deformable and is formed such that it exerts a counter force against deformation out of the neutral position.

9. The holding device as set forth in claim 1, wherein the connecting elements are formed such that the adjacent support elements in the carrying chain can be mutually angled.

10. The holding device as set forth in claim 9, wherein the connecting elements are designed as a joint or hinge.

11. The holding device as set forth in claim 1, wherein driven actuators are provided for displacement of at least two support elements of the carrying chain.

12. The holding device as set forth in claim 1, wherein the gripping devices are configured to exert a variable gripping strength independently of each other.

13. The holding device as set forth in claim 1, wherein sensors are provided on the support elements, wherein the sensors are configured to measure forces acting on the support elements, especially for forces acting along the carrying chain and/or forces acting along the lateral direction to the carrying chain.

* * * * *